(12) United States Patent
Coleman

(10) Patent No.: US 8,341,075 B2
(45) Date of Patent: *Dec. 25, 2012

(54) METHOD AND SYSTEM FOR USING A BAYESIAN BELIEF NETWORK TO ENSURE DATA INTEGRITY

(75) Inventor: Ronald Coleman, Hyde Park, NY (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/231,240

(22) Filed: Sep. 13, 2011

(65) Prior Publication Data

US 2012/0004949 A1     Jan. 5, 2012

Related U.S. Application Data

(62) Division of application No. 09/697,497, filed on Oct. 27, 2000, now Pat. No. 8,041,632.

(60) Provisional application No. 60/161,999, filed on Oct. 28, 1999.

(51) Int. Cl.
     *G06Q 40/00*     (2012.01)
(52) U.S. Cl. ........................................ 705/38
(58) Field of Classification Search ................ None
     See application file for complete search history.

(56) References Cited

U.S. PATENT DOCUMENTS

| | | | |
|---|---|---|---|
| 4,860,214 A | 8/1989 | Matsuda et al. | 706/52 |
| 4,866,634 A | 9/1989 | Reboh et al. | 364/513 |
| 4,975,840 A | 12/1990 | DeTore et al. | 705/4 |
| 5,073,867 A | 12/1991 | Murphy et al. | 706/42 |
| 5,546,502 A | 8/1996 | Hart et al. | 395/12 |
| 5,715,374 A | 2/1998 | Heckerman et al. | 395/81 |
| 5,761,442 A | 6/1998 | Barr et al. | 705/36 |
| 5,802,256 A | 9/1998 | Heckerman et al. | 395/75 |
| 5,852,811 A | 12/1998 | Atkins | 705/36 |
| 6,076,083 A | 6/2000 | Baker | 706/52 |
| 6,192,360 B1 * | 2/2001 | Dumais et al. | 1/1 |
| 6,304,833 B1 | 10/2001 | Ferkinhoff et al. | 703/2 |
| 6,336,108 B1 | 1/2002 | Thiesson et al. | 706/20 |
| 6,404,744 B1 | 6/2002 | Saito | 370/255 |

(Continued)

FOREIGN PATENT DOCUMENTS

JP          07114609        5/1995

(Continued)

OTHER PUBLICATIONS

"Information Theory and Statistic Method: Learning Technique," Yoichi Kimura, Journal of the Society of Instrument and Control Engineers, vol. 38, No. 7, pp. 468-473, Jul. 1999.

(Continued)

*Primary Examiner* — Olabode Akintola
(74) *Attorney, Agent, or Firm* — Eric L. Sopir; SNR Denton US LLP

(57) ABSTRACT

The present invention relates to a method and system for assessing the risks and/or exposures associated with financial transactions using various statistical and probabilistic techniques. Specifically, the present invention relates to a method and system for identifying plausible sources of error in data used as input to financial risk assessment systems using Bayesian belief networks as a normative diagnostic tool to model relationships between and among inputs/outputs of the risk assessment system and other external factors.

16 Claims, 4 Drawing Sheets

U.S. PATENT DOCUMENTS

| | | | |
|---|---|---|---|
| 6,456,622 B1 | 9/2002 | Skaanning et al. | 370/389 |
| 6,473,084 B1 | 10/2002 | Phillips et al. | 345/440 |
| 6,526,358 B1 * | 2/2003 | Mathews et al. | 702/51 |
| 6,542,905 B1 * | 4/2003 | Fogel et al. | 1/1 |
| 6,606,615 B1 | 8/2003 | Jennings et al. | 706/45 |
| 6,658,467 B1 | 12/2003 | Rice et al. | 709/224 |
| 6,671,661 B1 | 12/2003 | Bishop | 703/2 |
| 6,725,208 B1 | 4/2004 | Hartman et al. | 706/23 |
| 2002/0128943 A1 | 9/2002 | Schrekengast et al. | 705/36 |
| 2003/0130973 A1 | 7/2003 | Sumner et al. | 706/45 |

FOREIGN PATENT DOCUMENTS

| | | |
|---|---|---|
| JP | 08161573 | 6/1996 |
| WO | WO99/50773 | 10/1999 |

OTHER PUBLICATIONS

"On Knowledge Representation in Belief Networks," B. Abramson, Lecture Notes in Computer Science UCLA, 1991.

"Expert System for Foreign Currency Hedging," Spencer Star, 1985 AMC Thirteenth Annual Computer Science Conference Publication, New York, NY.

"Development of Corporate Risk Analyzing System Based on Financial Data ," Yoshida Toshihiro and Takamatsu Kosumo, Journals of Mitsubishi Research Institute, 1988, No. 15.

"The Impact of Explanation Facilities on User Acceptance of Expert Systems Advice," Richard L. Ye and Paul E. Johnson, MIS Quarterly, Jun. 1995, v19n2, pp. 157-172.

"Explanation in Bayesian Belief Networks (Uncertainty, Decision Support Systems, Medical Support Systems)," Henri J. Suermondt, Stanford University Dissertation Abstracts International, 1992, vol. 53/03-B, p. 1476.

"Enhanced Maintenance and Explanation of Expert Systems Through Explicit Models of Their Development," Robert Neches, IEEE Transactions on Software Engineering, vol. Se-11, No. 11, Nov. 1985.

\* cited by examiner

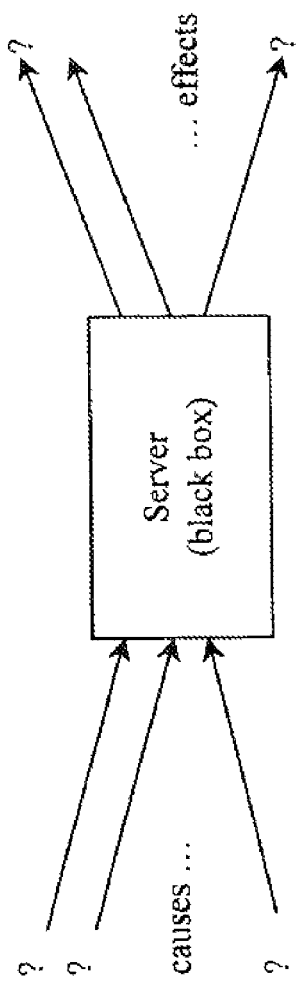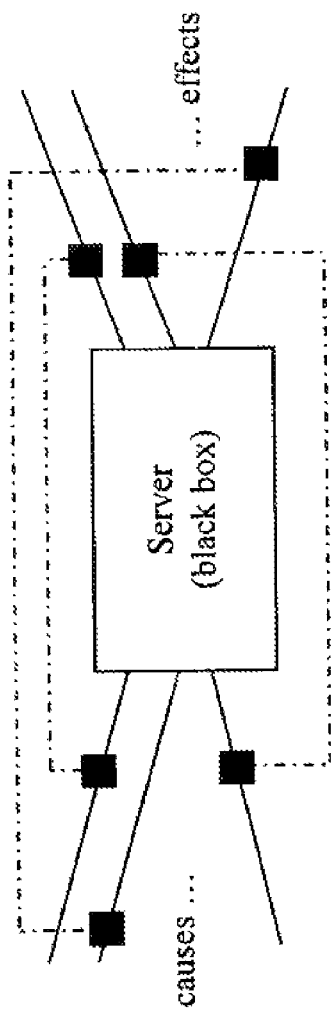

METHOD AND SYSTEM FOR USING A BAYESIAN BELIEF NETWORK TO ENSURE DATA INTEGRITY

CROSS-REFERENCE TO RELATED APPLICATIONS

This application is a divisional of and claims priority to U.S. patent application Ser. No. 09/697,497, entitled "METHOD AND SYSTEM FOR USING A BAYESIAN BELIEF NETWORK TO ENSURE DATA INTEGRITY," filed Oct. 27, 2000, now U.S. Pat. No. 8,041,632 which claims priority to U.S. Provisional Patent Application No. 60/161,999, filed Oct. 28, 1999, entitled, "METHOD AND SYSTEM FOR USING A BAYESIAN BELIEF NETWORK TO ENSURE DATA INTEGRITY," all of which are herein incorporated by reference in their entirety.

BACKGROUND OF THE INVENTION

1. Field of the Invention

The present invention relates to a system and method for measuring the financial risks associated with trading portfolios. Moreover, the present invention relates to a system and method for assuring the integrity of data used to evaluate financial risks and/or exposures.

2. Description of the Related Art

As companies and financial institutions grow more dependent on the global economy, the volatility of currency exchange rates, interest rates, and market fluctuations creates significant risks. Failure to properly quantify and manage risk can result in disasters such as the failure of Barings ING. To help manage risks, companies can trade derivative instruments to selectively transfer risk to other parties in exchange for sufficient consideration.

A derivative is a security that derives its value from another underlying security. For example, Alan loans Bob $100 dollars on a floating interest rate. The rate is currently at 7%. Bob calls his bank and says, "I am afraid that interest rates will rise. Let us say I pay you 7% and you pay my loan to Alan at the current floating rate." If rates go down, the bank makes the money on the spread (the difference between the 7% float rate and the new lower rate) and Bob is borrowing at a higher rate. If rates rise however, then the bank loses money and Bob is borrowing at a lower rate. Banks usually charge a risk/service fee, in addition, to compensate it for the additional risk.

Derivatives also serve as risk-shifting devices. Initially, they were used to reduce exposure to changes in independent factors such as foreign exchange rates and interest rates. More recently, derivatives have been used to segregate categories of investment risk that may appeal to different investment strategies used by mutual fund managers, corporate treasurers or pension fund administrators. These investment managers may decide that it is more beneficial to assume a specific risk characteristic of a security.

Derivative markets play an increasingly important role in contemporary financial markets, primarily through risk management. Derivative securities provide a mechanism through which investors, corporations, and countries can effectively hedge themselves against financial risks. Hedging financial risks is similar to purchasing insurance; hedging provides insurance against the adverse effect of variables over which businesses or countries have no control.

Many times, entities such as corporations enter into transactions that are based on a floating rate, interest, or currency. In order to hedge the volatility of these) securities, the entity will enter into another deal with a financial institution that will take the risk from them, at a cost, by providing a fixed rate. Both the interest rate and foreign exchange rate derivatives lock in a fixed rate/price for the particular transaction one holds.

Consider another example. If ABC, an American company, expects payment for a shipment of goods in British Pound Sterling, it may enter into a derivative contract with Bank A to reduce the risk that the exchange rate with the U.S. Dollar will be more unfavorable at the time the bill is due and paid. Under the derivative instrument, Bank A is obligated to pay ABC the amount due at the exchange rate in effect when the derivative contract was executed. By using a derivative product, ABC has shifted the risk of exchange rate movement to Bank A.

The financial markets increasingly have become subject to greater "swings" in interest rate movements than in past decades. As a result, financial derivatives have also appealed to corporate treasurers who wish to take advantage of favorable interest rates in the management of corporate debt without the expense of issuing new debt securities. For example, if a corporation has issued long term debt with an interest rate of 7 percent and current interest rates are 5 percent, the corporate treasurer may choose to exchange (i.e., swap) interest rate payments on the long term debt for a floating interest rate, without disturbing the underlying principal amount of the debt itself.

In order to manage risk, financial institutions have implemented quantitative applications to measure the financial risks of trades. Calculating the risks associated with complex derivative contracts can be very difficult, requiring estimates of interest rates, exchange rates, and market prices at the maturity date, which may be twenty to thirty years in the future. To make estimates of risk, various statistical and probabilistic techniques are used. These risk assessment systems—called Pre-Settlement Exposure (PSE) Servers—are commonly known in the art.

PSE Servers often simulate market conditions over the life of the derivative contracts to determine the exposure profile representing the worst case scenario within a two standard deviation confidence interval, or approximately 97.7% confidence. Thus, the PSE Server outputs an estimate of the maximum loss that the financial institution will sustain with a 97.7% chance of being correct. This exposure profile is calculated to give current estimates of future liabilities. As market conditions fluctuate from day to day or intra-day, the calculated exposure profile changes; however, these changes are not always due to market fluctuations, they are sometimes due to errors in the input data.

BRIEF SUMMARY OF THE INVENTION

In the past, input data errors have been manually detected by credit analysts; however, because the quantity of input data is so large, it is impractical for credit analysts to detect and correct all of the errors. Credit analysts are most likely to detect errors in the input data that cause a significant change in the exposure profile.

The Pre-Settlement Exposure (PSE) Server takes as input large amounts of transactions and market data and in turn produces a significant amount of data and the question is: Are the changes in the outputs due to a) the normal operation of the system involving statistical simulation, b) expected market fluctuations, c) business operations, d) system fault, or e) bad data. Thus, the accuracy of exposure reporting by the PSE Server depends on the precision of its analytics and the quality of the data. However, the data quality is not guaranteed and is difficult to test for every permutation. Yet experience indicates that systematic validation must be implemented because the possibility of artificially understating or overstating exposure can adversely impact the business.

Nevertheless, the large volume and complex nature of derivatives transactions and market data as well as the time constraints required to meet daily reporting deadlines virtually preclude manual inspections of the data. It is possible in principle to check every contract, every yield curve, or every exchange rate for they are inputs to the PSE Server. However, because of reporting deadlines and the pace of business, in practice this is not feasible on an intra-day or day-to-day basis. Thus, it is convenient to treat the Server as a black box in terms of understanding all the causes and effects that go into its operation.

The price to be paid for the black box perspective is that changes in counterparty exposure sometimes seem unexplainable, even mysterious. A counterparty is herein referred to a customer with whom there is some credit risk (e.g., the risk that the customer may not pay what is owed at some future date.) Even with a robot for automated verification analysis of the black-box Server to assist, there remains a notable number of anomalous exposure shifts which escape the drill-through analysis and consequently go "unexplained." Yet there must be a logical explanation, only there are rarely human resources to regularly pursue it except when a crisis arises or a problem becomes so intolerable the "experts" (such as credit administrators, systems programmers, etc.) must be called in to sift through all the data. The goal is to find a credible explanation from a) through e) above.

Nevertheless, this goal is not a simple task and in any event an enormous distraction and drain of resources that could otherwise be focused on more important business. If this process can be automated, at least for initial screening purposes, there is considerable opportunity for savings of staff time and improving productivity and end-to-end quality.

Hence, the preferred embodiments of the present invention provide a system and method for a customizable Bayesian belief network to diagnose or explain changes in the exposure profile of a risk assessment system, such as the Pre-Settlement Exposure (PSE) Server, by performing induction, or backward reasoning, to determine the most likely cause of a particular effect.

The preferred embodiments of the present invention further provide a method and system for identifying plausible sources of error in data used as input to financial risk assessment systems.

The preferred embodiments of the present invention further provide a method and system for implementing a Bayesian belief network as a normative diagnostic tool to model the relationship between and among inputs/outputs of the risk assessment system and other external factors.

The preferred embodiments of the present invention also provide a system and method for a Deep Informative Virtual Assistant (DIVA), which includes an automated normative, diagnostic tool designed to use a Bayesian belief network (also known as "Bayesian network") to "explain" changes in the exposure profile of a risk assessment system such as a PSE Server.

The preferred embodiments of the present invention further provide a system and method for a DIVA that provides sensitivity analysis and explanation context by indicating the relative importance of an explanation in relation to an alternative explanation.

The preferred embodiments of the present invention further provide a system and method for a DIVA that is fast in mining data and interacting with the expert. Thus, there is no perceptible degradation in performance of the normal processing times on the PSE Server, and the interactive response time is short per query per counterparty.

The preferred embodiments of the present invention also provide a system and method for, a DIVA that self diagnoses the explanation in terms of conflicts and contradictions.

The preferred embodiments of the present invention further provide a system and method for a DIVA that includes program modules, knowledge bases, statistical history, and constraints for performing deeper analysis of data. Its knowledge bases also contain detailed graphical information about causes and effects which allows the system to make plausible inferences about systems and processes outside the PSE Server "over the horizon" in both space in time.

The preferred embodiments of the present invention also provide a system and method for a DIVA that supports the volume, complexity, and multifaceted nature of the financial derivatives information processed by the PSE Server and performs logical, systematic analysis of data integrity on such information.

The preferred embodiments of the present invention further provide a system and method for a DIVA that is consistent for each counterparty and scalable at least with respect to the number of deals and amount of market data.

The preferred embodiments of the present invention also provide a system and method for a DIVA that is capable of making inferences "over the horizon" in both space and time to point to potential sources of problems outside the PSE Server. The DIVA is also capable of making predictions about future plausible outcomes given a state of knowledge.

The preferred embodiments of the present invention also provide a system and method for a DIVA that is designed in such a way that the contents and design of the knowledge base is independent of the inference engine; thus, DIVA can be modular for flexible modification.

The preferred embodiments of the present invention further provide a system and method for a DIVA having at least three operational modes: (a) pre-release, (b) post-release or follow up, and (c) preventative maintenance. Pre-release includes a mode after a feed has arrived but before the hold-release decision is made by the credit analyst. Post-release includes a mode after the hold-release decision is made when credit analysts are expected to further investigate a run. Finally, preventative maintenance includes a mode which is invoked periodically to scrub the system's data, looking for potential problems ignored or suppressed during pre-release or post-release modes. Each of these modes may also employ different standards of evidence used to filter the analysis.

The preferred embodiments of the present invention also provide a system and method for a DIVA that is configurable to explain production or quality assurance (QA) environments. In fact, since normally find (or expect to find) many more problems in QA, the system may have more utility here.

Additional aspects and novel features of the invention will be set forth in part in the description that follows, and in part will become more apparent to those skilled in the art upon examination of the disclosure.

BRIEF DESCRIPTION OF THE DRAWINGS

The preferred embodiments are illustrated by way of example and not limitation in the following figures, in which:

FIG. 1A depicts the Pre-Settlement Exposure (PSE) server as a black box with inputting causes and outputting effects in accordance to an embodiment of the present invention.

FIG. 1B depicts the PSE server as a black box having each outputting effect linked to an inputting cause in accordance to an embodiment of the present invention.

DETAILED DESCRIPTION OF THE PREFERRED EMBODIMENTS OF THE INVENTION

Figure 2:
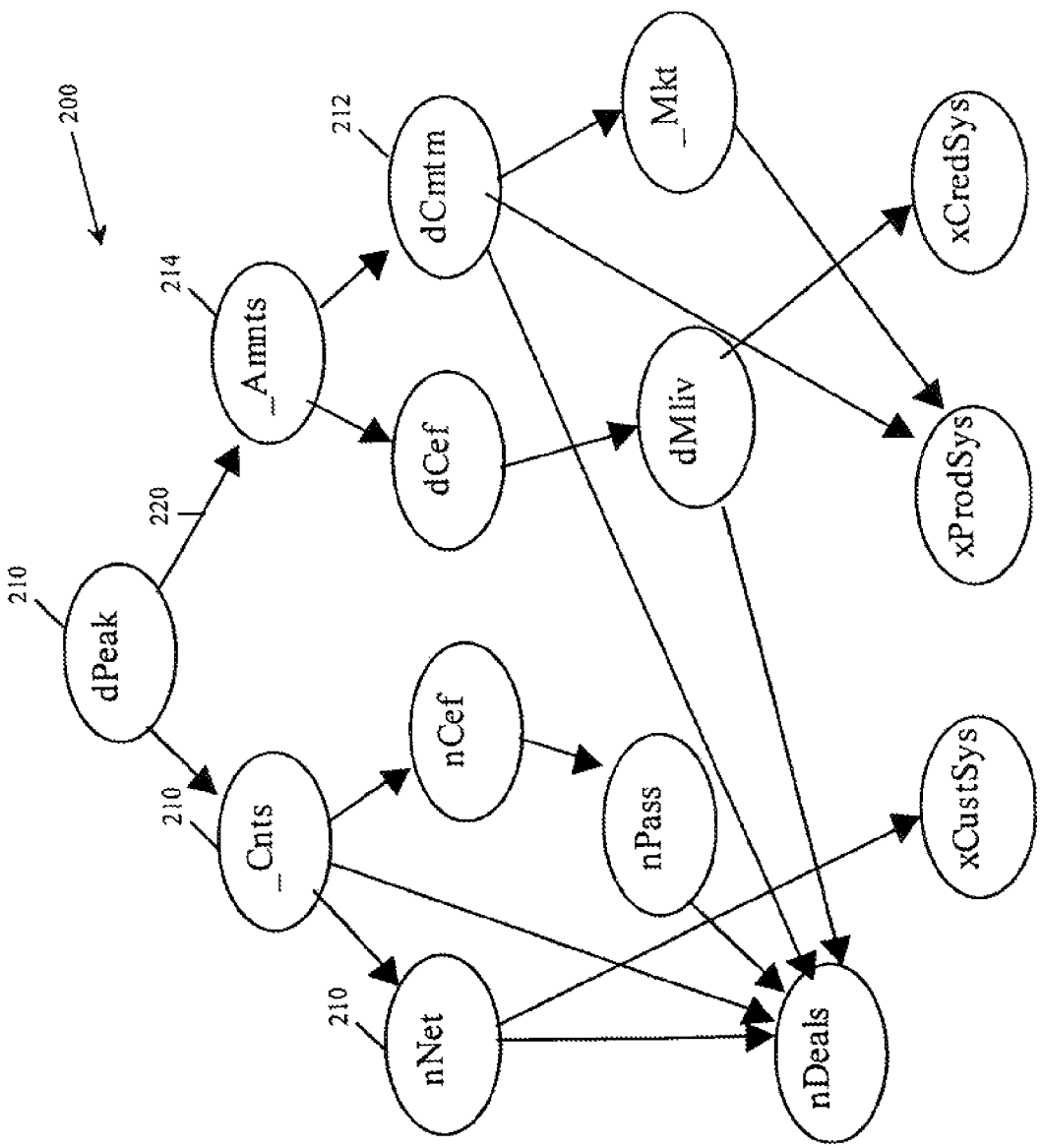
FIG. 2 depicts a Bayesian belief network in accordance to an embodiment of the present invention.

Referring now in detail to an embodiment of the present invention, the system and method for a Deep Informative Virtual Assistant (DIVA), which make use of customized Bayesian belief networks (also known as "Bayesian networks") to perform logical, systematic analysis of data integrity for risk assessment systems, such as Pre-Settlement Exposure (PSE) Servers, to ensure accurate evaluation of financial risks or exposures based on such information.

As is commonly known in the art, a Bayesian network works on the principle of Bayes' theorem, named after Thomas Bayes, an $18^{th}$ century Presbyterian minister and member of the British Royal Society. It is a knowledge base which is both structural and quantitative. The structural part is represented by a graph or network of nodes that describe the conditional relationships among variables in the problem domain. The quantitative part is represented by conditional probabilities that can be interpreted as the strengths of connections in the network.

According to an embodiment of the present invention, the PSE Server is a complex system with thousands of functions points. It takes as input financial information that fluctuates according to world market conditions. It also uses a statistical process, such as the Monte Carlo simulation, to estimate realistic market scenarios in the future. The Monte Carlo method provides approximate solutions to a variety of mathematical problems relating to risk estimation and exposure-profile generation by performing statistical sampling experiments. The method can be applied to problems with no probabilistic content as well as those with inherent probabilistic structure.

Because the PSE Server receives, analyzes, and generates large volumes of transactions and market data, it is practically impossible to check each and every datum. Thus, according to an embodiment of the present invention, it is convenient to treat the PSE Server as a black box in terms of understanding all the causes and effects that go into its operation. FIGS. 1A and 1B depict the PSE server as a black box with outputting effects associated with corresponding inputting causes.

Consequently, the essential problem is one of finding a needle in the haystack because most of the data received and generated by a PSE server is correct. Moreover, when there are significant changes in the data which usually cause significant changes in the exposure profile, these situations are generally obvious. Thus, it's the subtler, deeper problems that need to be discovered and corrected. By logical analysis, prior experience, and common sense, the DIVA according to one embodiment of the present invention is capable of finding the needle in the haystack. In other words, DIVA is capable of reliably relating specific causes to specific effects in the PSE server that saves staff time and resources.

While a risk assessment system, such as the PSE Server, can be treated as a black box according to the preferred embodiments of the present invention, it is expected to exhibit certain patterns of behavior according, informally, to the 80-20 rule. Namely, most problems are caused by a relatively few situations. For the reasons given above, the connection between cause and effect is not typically deterministic but probabilistic. As is known in the art, with a deterministic model, specific outcomes of an experiment can be accurately predicted; whereas, with a probabilistic model, relative frequencies for various possible outcomes of the experiment can be predicted but not without uncertainty.

The connections between causes and effects and their strength in terms of probability, as determined by DIVA, are represented in a knowledge base called a Bayesian belief network. According to one embodiment of the present invention, the belief network includes a graph capable of representing cause-effect relationships and decision analysis that allows an inference engine to reason inductively from effects to causes. Hence, as an automated but "supervised" assistant based on a belief network, DIVA is intended to support rather than replace the credit analyst.

In one embodiment of the present invention, a third party software package, such as the Hugin™ software, may be used to provide a Graphical User Interface (GUI) shell for developing belief networks and an Application Program Interface (API) for embedded applications. This software is herein referred to as the API software. This software does not generate artificial intelligence. Rather, its main job is to calculate the joint probability table, $$P(X_1, X_2, \ldots, X_N)$$

which would require $O(2^N)$ complexity for variables with just two states. For any realistic N, say N≈100, a direct implementation of this table exceeds the capacity of computers in service today and on the horizon for the foreseeable future. Yet without actually generating the full joint probability table, the belief network, implemented by API according to an embodiment of the present invention, can normally manage this problem efficiently using various mathematical methods and system techniques via software implementation that make use of more reasonable space and time.

According to an embodiment of the present invention, DIVA provides infrastructure supports, both conceptually and in software, which interfaces with the belief network. To that extent, at least one "expert" is employed to specify the knowledge base in the form of a belief network for DIVA, wherein the belief network represents a closed world of knowledge. Automated learning techniques may also be applied to automatically generate the knowledge base. DIVA is then used to interpret the results from the belief network. Indeed, one of the problems faced and resolved by DIVA is the question of what constitutes "evidence" that a change of significance has been observed when, as mentioned earlier, most of the time the data is correct. The fact that there may be a problem embedded within a much larger collection of correct data is the haystack. However, this fact can be seen as an advantage. According to an embodiment of the present invention, the initial probabilities of the Bayesian belief network can be set to reflect this experience, as explained in detail later.

According to an embodiment of the present invention, DIVA's job includes extracting the needle, i.e., identifying the source that plausibly accounts for the problem. According to the present invention, plausibility refers to the existence of a psi residue of uncertainty with any given assessment. Even if DIVA cannot find a problem, it can rule out sources that are not likely causing the problem, which remains useful to know in assessing the cause of an effect.

Because the belief network represents a closed world of knowledge, there arises the possibility of logical contradictions. According to an embodiment of the present invention, the idea of the closed-world representation of the belief network is that DIVA conforms to Gödel's incompleteness theorem. As is known in the art, the Gödel's incompleteness theorem limits what a system can do. That is, within any logical system, there exists propositions that can neither be proved nor disproved. Hence, any attempt to prove or disprove such statements by the defined rules within the boundary of the system may result in contradiction. Accordingly, for DIVA to conform to Gödel's incompleteness theorem, it would mean for all practical purposes that DIVA either a) finds the cause for an effect with certainty, i.e., probability 1, or b) contradicts itself.

A contradiction does not indicate that DIVA fails to function properly. Indeed, if a Bayesian belief network produces a contradiction, DIVA indicates that it is in this state and can thus inform the credit analyst. A contradiction can mean (a) the inference engine that drives the belief network such as the API software or DIVA ahs a bug that needs to be fixed; (b) more likely that the belief network is either truly contradictory, in which case there is a bug in its design that needs to be fixed; or (c) more likely that the network is incomplete. If the network is incomplete, that, too, is useful to know because it provides information needed to bring the hypothesis space of the knowledge base more in line with actual experience.

According to an embodiment of the present invention, DIVA can add context because it understands the causes and effects in the PSE Server and how they are plausibly related in a Bayesian probabilistic sense. Thus, DIVA is able to infer the conditional of a hypothesized cause by reasoning backward from observed effects. Indeed, DIVA can describe the prior probability of a cause, which is to say, before observing any effects. As is commonly understood in the art, a prior probability is the probability given only the background constraints. This is a consequence of Bayesian reasoning which requires the prior probability to start the analysis.

The basic problem to be solved by the preferred embodiments of the present invention is captured in FIG. 1A. After the PSE Server 100 completes a run, the exposure profile may change significantly for any number of reasons. However, from the credit analyst's point of view, the connection between cause and effect is not always clear and in any case its strength cannot be accurately assessed since this information is not generally available to the credit analyst.

According to an embodiment of the present invention, the basic idea of DIVA is to correlate causes and effects, as shown in FIG. 1B, using a Bayesian network which is a special knowledge base. This new approach is possible by (1) observing the effect, $Y_{effect}$, and computing the conditional probability, $P(Y_{effect}|Z_{cause})$ and then (2) assessing the plausibility of a cause, $Z_{cause}$, and compute $P(Z_{cause}|Y_{effect})$, provided that this distribution is known through a well defined theory, empirical observations, or "bootstrap" analysis. In a preferred embodiment, a combination of the latter two is used, i.e., empirical observations and bootstrap analysis, to compute $P(Y_{effect}|Z_{cause})$. The calculation $P(Y_{effect}|Z_{cause})_1$ can be "reversed" to compute $P(Z_{cause}|Y_{effect})$ using Bayes theorem embodied in the Bayesian belief network.

Thus, according to preferred embodiments of the present invention, there is provided a DIVA that uses a Bayesian belief network for systematically explaining what is happening (or not happening) in the PSE Server by connecting directly observable causes and effects it finds on the PSE Server. DIVA looks more deeply in the data and can also look beyond the PSE Server, i.e., "over the horizon." The concept, "over the horizon," can refer to space or time or both simultaneously. In space inference, DIVA can reason about causes, for example, in the product, credit, and customer information systems that are not formally part of the PSE Server but are nevertheless part and parcel of the end-to-end logical flow. Accordingly, space is the logical separation between independent subsystems which may or may not be physically separated.

"Over the horizon" can be in time as well using postdiction or prediction. In other words, DIVA ordinarily describes what has happened after the PSE Server completes it simulation. However, it also can make predictions about what is likely to happen given the incomplete information in the form of inputs from the product, credit, and customer systems which must be available before the PSE Server starts its simulation. This predictive feature is extremely useful because using Monte Carlo simulation to measure credit risk can run for eight hours or more for just one portfolio. DIVA can "forecast" the likely results before this long running process starts, recommend an abort if the process looks like it won't be successful (since the inputs may look incorrect and unlikely to give accurate results), and start the next job in the job stream which appears to have a greater chance of generating high quality results.

The Bayesian belief network used by DIVA for diagnosing and/or explaining changes in the PSE Server exposure profile is now described in accordance to one embodiment of the present invention shown in FIG. 2. The Bayesian belief network 200 may be implemented by the aforementioned third-party API software. It comprises a probabilistic description of beliefs or knowledge linking causes to effects. It includes a collection of chance nodes 210 that represents the probability of change in PSE Server variables, and connections between the nodes. Table 1 defines the hypothesis variables shown in FIG. 2.

TABLE 1

| | |
|---|---|
| nDeals | number of deals |
| nNet | number of netted deals |
| nPass | number of deals that could be simulated |
| nCef | percentage of rejected deals. Note nCef = (nDeals − nPass)/nDeals |
| dPeak | Dollar peak value used as a proxy for the exposure profile |
| dCmtm | dollar day-zero current mark to market |
| dMLIV | most likely increase in value |
| dCef | Credit exposure factor |
| xCustSys | external variable describing the Customer System (source of netting information) |
| xProdSys | external variable describing the Product System (source of information regarding brokered deals) |
| xCredSys | external variable describing Credit System (source of information for computing credit exposure factors) |
| _Amnts | abstract variable of high-level dollar amounts in the, e.g., day-zero CMTM |
| _Cnts | abstract variable of high-level counts |
| _Mkt | abstract variable of market data which could be observed but do not |

As shown in Table 1, each node represents a random or chance variable, or uncertain quantity, which can take on two or more possible values. According to one embodiment of the present invention, the nodes represent stochastic state variables that have states. In other words, the variables represent probability distributions of being in a given state. In a preferred embodiment of the present invention, each node has exactly two, mutually exclusive, discrete states: true or false;

hence, all nodes are discrete Boolean. The variables may comprise information relating to, for example, input data, output data, intermediate data, and/or external data of a risk management system such as the PSE Server. The arrows 220 connecting the nodes indicate the existence of direct causal influences between the linked variables, and the strengths of these influences are quantified by conditional probabilities. For instance, the variable dCefs is dependent on the variable _Amnts in FIG. 2.

In a preferred embodiment of the present invention, prefixes are used in Table 1 to denote the type of the cause or effect being modeled. For instance, "nY" means "Y is a hypothesis about counts," and "dX" means "X is a hypothesis about dollar amounts." The other prefixed are provided in Table 2 below.

TABLE 2

| Prefixes | Observable | Quantity |
| --- | --- | --- |
| n | Yes | Count |
| d | Yes | Dollar |
| p | Yes | Proportion |
| v | Yes | Value |
| s | Yes | Structure |
| — | No | Abstraction |
| x | No | External |

As shown in Table 2, there are five classes of observable variables. These variables are "observable" in the sense that they can be observed and measured in the PSE Server. In other words, hard evidence can be obtained for these observable variables. They are the basis of "over the horizon" analysis in terms of space, time, or both. In other words, the observed variables on the PSE Server can be used to infer plausible causes outside the Server, as explained later in further detail. Table 2 also shows two classes of unobservable variables: abstractions (_Y) and externals (xY). In Bayesian network terminology, abstractions are called divorce variables that limit or manage the fan-in of causes and effects. Fan-in herein refers to the number of parent variables which affects a single variable. Abstractions serve primarily as mechanisms for hiding details and organizing the network. They are devices used to help organize other variables, observable or otherwise. Abstractions may also be observable variables that were not chosen for observation. In this sense, abstractions are virtual nodes with only circumstantial causes or effects. They are network modeling devices. They cannot have hard evidence, namely, actual findings in the real world. They can only have findings which are inferred from hard evidence provided elsewhere in the network.

External variables, on the other hand, model variables in the real world except they cannot be measured directly. Their existence is presumed from experience. Like abstractions, external variables cannot have hard evidence, only circumstantial evidence. External variables, however, are more than modeling devices. They give the plausibility for systems outside the PSE Server, or in any case, outside the network which is very useful information. Like abstractions, external variables only have "soft" or circumstantial evidence.

FIG. 2 shows a Bayesian belief network 200 with only fourteen variables. These variables constitute a relatively small design of low complexity chosen here for simplicity in explaining the preferred embodiments of the present invention. However, it should be understood that the network 200 may contain more or less variables depending on the size of the PSE Servers and/or the number of variables a credit analyst wishes to observe. According to an embodiment of the present invention, the size and complexity of the design of the Bayesian belief network 200 is a function of the number of variables in the problem domain to explain. The number of nodes and their connectivity in the Bayesian belief network is a measurement of its complexity, this complexity, which is called IQ, can be estimated by the following formula:

$$IQ = k - k_{min} + 1,$$

where k is the number of connections, and $k_{min}$ is the minimum number of connections required for a completely connected graph. For instance, the Bayesian belief network of FIG. 2 has an IQ of 5.

Hence, the DIVA according to an embodiment of the present invention is scalable to accommodate any size of the Bayesian belief network 200. The interested variables in the problem domain are first order variables representing hypotheses about statistically distributed causes and effects. They are used to explain a large majority of exposure shifts, such as credit exposure shifts, on the PSE Server. These first-order variables are chosen because they control what may be considered "first-order" effects. That is, past experience indicates that when the exposure profile of the PSE Server changes significantly, the expert normally considers the data from these first-order variables first before looking elsewhere.

As mentioned earlier, connections between the nodes represent conditional probabilistic influences. For example, there is a connection from a node Z representing an object z to a node Y representing an object y, if Z causes Y. In such a network, node Z is said to be a parent of node Y. Alternatively, node Y is said to be a child of node Z. The difference between Z (big Z) and z (little z), or between Y (big Y) and y (little y), will be explained later.

According to an embodiment of the present invention, each node and its parents in the Bayesian network 200 represents a two-state conditional probability distribution, namely, $P(Z_j|Pa(Z_j))$, where $Pa(Z_j)$ are the parent nodes of node $Z_j$. Furthermore, the Bayesian belief network 200 represents implication, not causality. Thus, if Y is a node with a parent Z, then Z implicates Y with probability P(Y|Z). For example, there is a link in the Bayesian network 200, P(dCmtm\dPeak), which is described as a change in the peak exposure which implicates a change in the CMTM (current mark to market). In other words, if a change in peak value is observed, a change in CMTM is a suspect which has to be confirmed or ruled out on the weight of evidence (WOE), which will be described in detail later.

According to one embodiment of the present invention, the belief network 200 is first loaded with initial distributions or probabilities consistent with the state of knowledge prior to considering evidence. In other words, the belief network 200 is initially biased in favor of certain conclusions. The source of this initial bias may range from an objective, well-defined theory to completely subjective assessments.

According to an embodiment of the present invention, the initial distributions of variables x and y are hypotheses, as denoted by H(x) and H(y), respectively. Then a node x with a parent y specifies a hypothesis H(x) given H(y) written as H(x)|H(y). H(x) is the working or null hypothesis about x, namely, that "x has not changed." Thus, the initial distributions have been set up such that the bias is toward disbelief about changes which in fact corresponds to direct experience because, as noted earlier, most variables in the PSE Server are correct most of the time. Thus, the null hypothesis has a practical basis in reality. As is understood in the art, a null hypothesis is one that specifies a particular state for the parameter being studied. This hypothesis usually represents the standard operating procedure of a system of known specifications.

Hypotheses, of course, are statements. They are either true (T) or false (F), and they obey the rules of logic. Because H(x) is the working hypothesis, it is initially assumed to be true. Thus, for the sake of simplicity, H(x) herein means H(x)=T. Then ~H(x) negates the assumption, meaning the hypothesis that "x has not changed" is false. H(x)H(y) means the hypothesis that "x has not changed" and "y has not changed" is true. H(x)+H(y) means the hypothesis that "x has not changed" or the hypothesis "y has not changed" is true or both are true.

Because the hypotheses are logical, the nodes 210 in the belief network 200 shown in FIG. 2 are two-state or Boolean, as mentioned earlier. That is, each variable has only two possible states: T or F. The Bayesian belief network is now used to determine the probability of the null hypothesis for each variable. In classical statistics, this the meaning of the p-value: the probability of incorrectly rejecting the null hypothesis. Consequently, the p-value of H(x) can be written as P(H(x)).

When the null is conditioned, for example, then the conditional working hypothesis about x is true given that some other hypothesis about y is true. As mentioned earlier, this is denoted by H(x)|H(y). Consequently, the conditional probability is P(H(x)|H(y)), that is, the probability of the hypothesis that "x has not changed" given the hypothesis that "y has not changed". To avoid confusion with the to notation and without loss of generality, P(X|Y) will be used hereinafter to denote the conditional probability, wherein it is understood that X and Y are hypotheses about x and y, respectively. In other words, $P(X|Y)=P(H(x)|H(y))$; with X=H(x), Y=H(y).

It should be clarified that X and Y are not random variables in the classical sense. What is distributed is not X or Y but the probability P(X|Y). Hypotheses X and Y are logical statements about objects x and y, and P(X|Y) is a plausible statement about the believability of X assuming Y.

According to an embodiment of the present invention, the design of the Bayesian network comprises two features: quality and quantity. Quality is expressed in the structure or architecture of the network while quantity is expressed by the probability distributions. The quality or network structure is the more important feature of the two, for it describes the precise nature of believed implications in the system. Thus, P(X|Y) gives a different implication relationship compared to P(Y|X).

For instance, referring back to FIG. 2, let dCmtm 212 represent the hypothesis that the "current mark to market exposure of the portfolio has not changed," and let dPeak 214 represent the hypothesis that the "dollar peak exposure value of the portfolio has not changed." Thus, P(dCmtm\dPeak) and P(dPeak\dCmtm) are permissible by the rules of logic, but in practice they have different meanings. The former is meaningful for implication as a weak form of causality and is used in preferred embodiments of the present invention. The latter is meaningful for a strong form of causality which is not advocated because while dCmtm 212 dCmtm 212 does effect dPeak 214, the nature of this relationship is unreliable for purposes of the present invention.

Another reason that the network structure is more important is that given sufficient evidence, a Bayesian network can converge to the "right" answer despite its initial bias. "Right" in this case is used in the sense of "same." Convergence and the rate of convergence depends on the network's initial bias as well as on the WOE that has been submitted. Theoretically, this is proven by the observation that the initial bias acts as a constant or level and in the limit the ratio of the two systems of beliefs equals one because the WOEs are the same, overriding the initial discrepancy. The mathematical justification for this goes as follows.

Let $O(A_{ik})$ be the prior odds of some hypothesis $A_i$ under a belief system k. Let $O(A_{ij})$ be the prior odds for the same hypothesis $A_i$ under a belief system j. Systems k and j differ only in the prior probabilities; however, they agree on the meaning of evidence given in the Bayes factor, $\beta_i$. Thus, given sufficiently large evidence, the WOE for the two systems will converge, i.e., $$\lim_{\beta_i \to \infty} \frac{\log O(A_{ik}) + \beta_i}{\log O(A_{ij}) + \beta_i} = 1$$

Thus, while the choice for the initial distributions is not of primary concern, such distributions should be chosen carefully to avoid distributions that cause the belief network to contradict itself.

Self-contradiction by the belief network may ultimately cause problems. This is an issue that involves Gödel's incompleteness theorem, as mentioned earlier. The solution is Cromwell's Rule, which forbids the use of zero or one probabilities anywhere in the Bayesian network, including initial probabilities. Cromwell's Rule also plays a special role when re-sampling is used to generate the likelihood distribution, $P(f_i|A)$. This will be discussed later.

According to an embodiment of the present invention, the initial distributions or probabilities comprise prior probabilities and initial conditional probabilities. The initial probabilities can be set by (a) using the advice of an "expert," (b) learning from the data automatically, or (c) applying the following values (which may be justified by observing again that most of the data is correct most of the time):

$P(Z_j=T|Z_{k=j}=T)=0.95$;

$P(Z_j=T|Z_{k=j}=T)=0.05$

The first distribution indicates a 95% certainty that the null hypothesis is correct, i.e., the feature represented by $Z_j$ has not changed when its parent, $Z_{k=j}$, has not changed. The second distribution indicates a 5% certainty that the null hypothesis is correct, i.e., the feature represented by $Z_j$ has not changed when its parent, $Z_{k=j}$, has changed. This follows from common sense and conforms, once again, to actual experience.

When $Z_j$ has more than one parent, then the initial conditional probabilities can be derived from noisy-or functions or logical-or functions. If, for instance, a network P(A\B,C) is built using noisy-or, the CPT can be calculated using:

$P(A|BC)=P(A|B)+P(A|AC)-P(A|B)P(A|C)$, where A=T represents some probability conditioned on B=T and C=T. In other words, each hypothesis is in the true state. When a hypothesis is not in the true state, namely, A=T, B=T, and C=F, the CPT is calculated using:

$P(A|BC)=P(A|B)$, $P(A|B)=P(B)$;

and when A=T, B=F, and C=T, the CPT is calculated using:

$P(A|BC)=P(A|C)$, $P(A|C)=P(C)$;

and when A=T, B=F, and C=F, the CPT is calculated using:

$$P(A\backslash BC)=1-[P(A\backslash B)+P(A\backslash C)-P(A\backslash B)P(A\backslash C)],$$

According to an embodiment of the present invention, the noisy-or calculations are used for two important reasons. First, the noisy-or can be generalized for an arbitrary number of parents where conditional probabilities can be combined using set theoretic permutations. Thus, for P(A|BCD), the probabilities may be combined as $$P(A\backslash BCD)=P(A\backslash B)+P(A\backslash C)+P(A\backslash D)-[P(A\backslash B)P(A\backslash C)+P(A\backslash B)P(A\backslash D)+P(A\backslash C)P(A\backslash D)]+P(A\backslash B)P(A\backslash C)P(A\backslash D),$$

for the case where all hypotheses are in the true state.

Second, noisy-or satisfies Cromwell's Rule because the resulting probability will be asymptotically one (i.e., $\Sigma P(A\backslash Pa(A)) \to 1$) as long as the conditional probabilities are not zero or one where Pa(A) are the individual parents of A. If the network P(A|BC) is built using logical-or, there is no need to calculate the above conditional equations. In fact, logical-or networks are much simpler to construct. However, they do not satisfy Cromwell's Rule because by definition the CPT will contain a zero probability if all hypotheses are in the false state. The network will contain a one probability otherwise. This need not be a problem. As long as the prior probabilities are Cromwellian (i.e., non-zero and non-one), contradictions can be avoided.

To make the distinction between noisy-or and logical-or clear, illustrative CPTs for both noisy-or and logical-or are given in Tables 3 and 4 below for a network example, P(A|BC). In either case, the prior probabilities are set at, for example, P(B=T)=0.85 and P(C=T)=0.95. Note: P(B=F)=1−P(B=T)=0.15 and P(C=F)=1−P(C=T)=0.05. First, the values for noisy-or CPT are calculated using the above equations as:

TABLE 5

| BC | | FF | FT | TF | TT |
|---|---|---|---|---|---|
| A|BC | F | 0.9925 | 0.05 | 0.15 | 0.0075 |
|  | T | 0.0075 | 0.95 | 0.85 | 0.9925 |

As shown from Table 5, the initial conditional probabilities are determined from the prior probabilities. However, the identical configuration under logical-or is:

TABLE 6

| BC | | FF | FT | TF | TT |
|---|---|---|---|---|---|
| A|BC | F | 1 | 0 | 0 | 1 |
|  | T | 0 | 1 | 1 | 1 |

Thus, logical-or and noisy-or are not identical. However, as the two CPTs suggest above, they can serve as approximations for each other. In general, noisy-or is preferred when the fan-in is low, and logical-or is preferred when the fan-in is high. When fan-in is low, the above equation can be readily calculated and verified. When the fan-in is high, the above equation can be calculated but the number of combinations is high. Moreover, even if the calculation is automated, it will remain difficult to verify each combination of inputs. For instance, for a node with eight parents, there are $2^N$ or $2^8=256$ combinations (because each node has two states). Also, because the noisy-or probabilities still must be entered manually into a causal probability table (CPT), changing the probability of one of the parents, i.e., B in P(A|B), will affect the entire network. This is impractical if the fan-in is highly.

Figure 3:
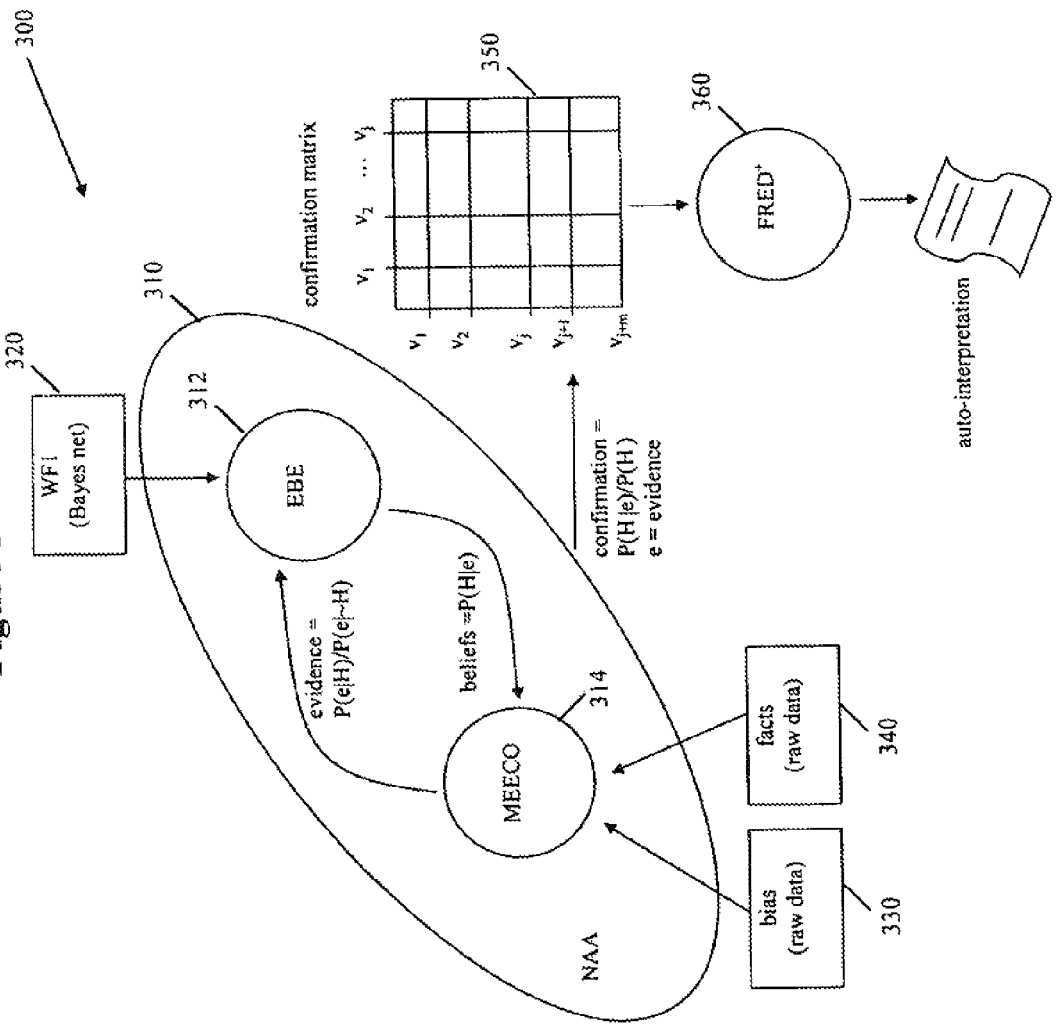
FIG. 3 depicts an architecture for a Deep Information Virtual Assistant (DIVA) in accordance to an embodiment of the present invention.

A DIVA that uses the aforementioned Bayesian belief network for analyzing the PSE Server is now described. FIG. 3 shows a DIVA architecture 300 according to an embodiment of the present invention. The DIVA 300 comprises programs, data, and a knowledge base. The programs are written in two modules, a normative auto assistant (NAA) 310 and a data grabber (not shown). The term "normative" herein refers to the reliance on underlying mathematical theories, such as the laws of probability. The NAA 310 is where all the Bayesian logic is programmed. It can be implemented by any suitable computer programming language, such as Microsoft Visual C++. Thus, the NAA 310 can run wherever there is a compiler for the computer programming language. The data grabber gets the raw data of the observable variables in the PSE Server for the NAA 310. According to an embodiment of the present invention, the data grabber can be written in a program script, such as Perl, and runs on the PSE Server.

According to a further embodiment of the present invention, the two major components of the NAA 310 are the electronic brain equivalent (EBE) 312 and the main evidence extraction component (MEECO) 314. Each of these are programming objects, such as C++ objects, that interact with each other in a tight loop as shown in FIG. 3. The main function of the EBE 312 is to thinly encapsulate using object-orientation calls to the API of the third-party API software, which is not object-oriented. The EBE 312 further provides mapping between three name spaces: nodes, variables, and observables.

Nodes are objects which the API manipulates as opaque types. The API software also has domains, objects that describe a Bayesian network which contains nodes. The EBE 312 completely hides these details. Variables are objects of interest, that is, the fourteen variables given in the tables above. Observables are a subset of variables, i.e., those given in the table of observable variables. The distinction between one another name space is needed for two reasons.

First, variables are a construct invented as a proxy for the Bayesian network nodes. These nodes are C pointers in the third-party API software, whereas variables are integers. Indeed a variable is just an index to a vector of void pointers. Second, the ordering of the variables is arbitrary: the Bayesian network nodes are organized abstractly (i.e., the algorithm of assignment is hidden in the API software) and as the nodes are loaded, they are assigned an integer index in a sequence. Thus, mapping is needed between variables and nodes.

Figure 4:
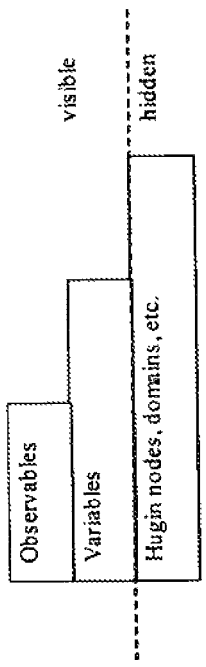
FIG. 4 depicts the name space relationships in a Bayesian belief network as implemented by a third-party software in accordance to an embodiment of the present invention.

Second, as a consequence, observables are scattered among the variables in random sequence, although observables are generally manipulated in a given order according to a speculative hypothesizer or interpreter (ASH) function that may be implemented implicitly by the NAA 310. This ASH function will be discussed later. Thus a mapping is needed between variables and observables. The EBE 312 manages this. The relationships between these name spaces are shown in FIG. 4.

As mentioned earlier, the MEECO 314 is also a programming object. Its primary function is to convert raw data of the observable variables into evidence. Implicitly encapsulating a weigh-in (WEIN) function, the MEECO 314 then sends the evidentiary findings into the EBE 312. This WEIN function will be discussed later. The EBE 312 also retrieves beliefs by variable from the Bayesian belief network 320 whether or not "hard" evidence has been entered. If no evidence has been supplied, the EBE 312 returns the initial priors and conditionals. As also shown in FIG. 3, the NAA 310 interacts with a fast recursive diagnostic (FRED) interpreter 360, via a confirmation matrix 350. The FRED interpreter 360 may be a separate program, as shown in FIG. 3, or it may be an object embedded within the NAA 310. The algorithm for FRED interpreter 360 is provided and discussed next in accordance to an embodiment of the present invention.

The FRED algorithm automates the interpretation of the confirmation matrix. It can be easily programmed and used to write a more systematic report for the user. The idea of FRED testing the "complexity" of the matrix and analyzing the confirmations accordingly.

The complexity, K, is an estimate of the interpretation effort. It is the number of self-confirmations $\geq 5$ db, not including the peak exposure.

FRED works recursively using K. At any given level of recursion, FRED wants to interpret matrices of low or moderate complexity. If the complexity is greater, it reduces the complexity by one and calls itself recursively, trying again. It then backtracks.

The FRED algorithm is given below. On the notation, [V] is a vector of variables, n([V]) is the length of the vector, and [V] starts at index 0. $V_i \rightarrow V_j$ means variable i implicates variable j or alternatively, variable j effects variable i.

```
procedure fred([V])
begin
    K = n([V])
    case K ≤ 1:        // low complexity
        report the V₀ as the explanation with confirmation
        check unobservables and report indirect confirmations ≥
5 db
        return
    case 1 < K ≤ 2:    // moderate complexity
        sort [V] by implication using the BN
        if V₁ → V₀ then
            fred([V₀])
        else if V₀ → V₁ then
            fred([V₁])
        else   // two possible effects, neither implicating the
other
            Sort [V] by marginal importance
            fred([V₀])
            fred([V₁])
    case K > 2:        // high complexity
        Sort [V] by implication using the BN
        if Vⱼ → Vᵢ for all i ≠ j then
            fred([Vⱼ])
        else   // there are two or more effects
            Sort [V] by self-confirmation
            fred([V₀...Vₙ₋₂])   // eliminate the lowest
            confirmation
            fred([Vₙ₋₁])        // backtrack to explain
eliminated variable
end procedure fred
```

Note that the FRED algorithm does not take into account potential inconsistencies. For instance, there's positive self-confirmation for dCef but no self-confirmation for dCmtm nor for dMliv. Technically this is a data conflict which should be written into the algorithm.

According to an embodiment of the present invention, the raw data of each observable variable comprise two types: bias data 330 and fact data 340. Bias data are historical views of what has happened in the past which bias the analysis. The fact data are the data to be explained. The biases 330 and facts 340 comprise k×N tables of raw data extracted from the PSE Server via a server archive (not shown), where N is the number of observable variables which is 8 for the Bayesian belief network 200 of FIG. 2. (Actually, the raw data contains N=7 variables but N=8 are created by deriving one of the variables, nCef, from two others.) The value of k, i.e., the number of rows or vectors of variables, is independent for the biases and facts.

The knowledge base of DIVA comprises the Bayesian network 200 (FIG. 2) as implemented by the aforementioned third-party API software. Thus, the knowledge base includes all observable and unobservable variables, the network of conditional probabilities, and the initial priors and conditional parameters.

Figure 5:
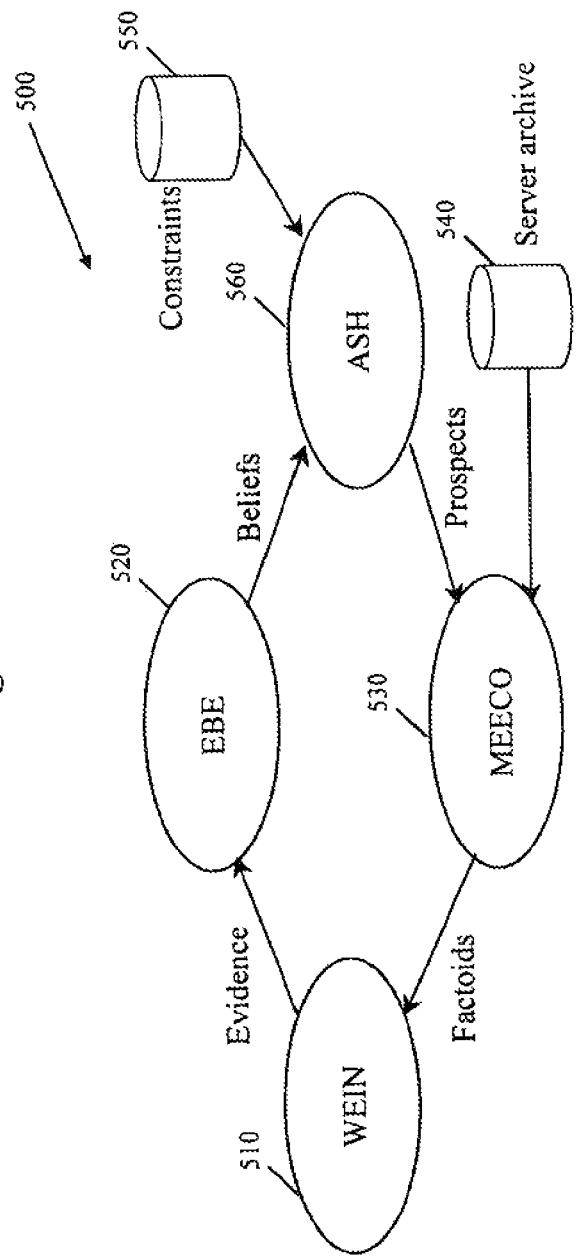
FIG. 5 depicts a general architecture for a DIVA in accordance to an embodiment of the present invention.

FIG. 3 is a specific embodiment of FIG. 5. In other words, FIG. 5 shows a more general scheme for a DIVA architecture in accordance with preferred embodiments of the present invention. FIG. 5 depicts a general DIVA architecture 500 showing the main functional modules and their relationships in accordance to another embodiment of the present invention. These modules represent a plurality of support features which DIVA may contain to effectively use the Bayesian belief network as implemented by the API software.

As shown in FIG. 5, the belief network is loaded and accessed through the belief network API of the API software using an EBE 520 of DIVA. The EBE 520 is the same EBE 312 shown previously in FIG. 3. The EBE 520 also takes as input the evidence from the weigh-in (WEIN) 510, gives its data to the Bayesian belief network (not shown) to update the state of knowledge, and gets back beliefs which it then sends to an Automated Speculative Hypothesizer (ASH) 560 to interpret. The Bayesian belief network used for the DIVA 500 is the same network used in the DIVA 300 of FIG. 3. The ASH 560 then sends the prospects according to its interpretation of the beliefs to the Main Evidence Extraction Component (MEECO) 530. The relationships between the WEIN 510, the ASH 560, and the MEECO 530 are described next.

As mentioned earlier, the automated speculative hypothesizer or ASH 560 interprets beliefs from the EBE 520. In other words, the ASH 560 determine the new evidence to extract from the PSE Server. The ASH 520 may be a programming object used for applying the constraints 550 for seeking out the most plausible suspect which has not already been implicated or ruled out. The issue to be considered is the classic one of searching depth-first vs. breath-first. In other words, according to one embodiment of the present invention, the ASH 560 can output the top N prospects of interpreted beliefs and let the DIVA system try to absorb them all in one evidence instantiation. Alternatively, the ASH 560 can output one prospect at a time to allow the DIVA system to absorb each in turn before a new prospect is considered. The DIVA system can advance along a specific path, eliminating variables in a pre-programmed manner. This is called structured supervision. Alternatively, the DIVA system can jump to conclusions given whatever it finds interesting. This is called unstructured supervision.

As mentioned earlier, the above options and others are decided by constraints 550. In a preferred embodiment, the Jaynes' sequential admission rule is applied as a constraint. This rule provides for the testing of the most promising prospect(s) first and then proceeding to the next promising one(s). Thus, this implies that the ASH 560 may sort all beliefs into ascending order and pick the top one(s) to pursue.

Referring back to the DIVA architecture 300 of FIG. 3. Although there is not shown an ASH or speculative interpreter in the loop between the EBE 312 and the MEECO 314, the aforementioned ASH function remains in the NAA 310 in accordance to that embodiment of the present invention. Specifically, the plausibility constraint (as depicted by constraints 550 in FIG. 5) can be removed, and the NAA 310 can be programmed to seek out suspects in a pre-programmed manner. According to DIVA architecture 300 of FIG. 3, the NAA 310 is sufficiently fast such that all variables can be checked without serious time penalties. Thus, it is redundant to use an ASH to optimize the search by going after the most promising prospects in the DIVA 300.

Reference is now made to the Main Evidence Extraction Component or MEECO 530 in FIG. 3. As seen from the figure, the MEECO 530 takes the prospects output by the ASH 560 and by searching the PSE Server archive 540 for raw biases and fact data of observable variables, converts the prospects to factoids. A factoid includes factual data of an evidentiary nature that remains to be substantiated.

The MEECO 530 extracts factoids by analyzing changes in the PSE Server historical backup. If the MEECO 530 is given a list of backups, it produces a baseline statistical database, which contains the sum of squares for each variable. If it is given just two backups, it produces just the changes between two runs. According to a preferred embodiment of the present invention, the MEECO 530 extracts everything; however, it does not use thresholds. That is the job for the WEIN 510. It should be noted that the MEECO 314 of the DIVA architecture 300 (FIG. 3) is similar to the MEECO 530 of the DIVA architecture 500, except that the MEECO 314 also performs the job of the WEIN 510, which is described next.

The WEIN 510 is a crucial component of DIVA. It allows DIVA to find the needle in the haystack as follows. DIVA keeps sufficient statistics in a database which is built and updated periodically by the MEECO 530. To diagnose a feed, DIVA invokes the MEECO 530 for the prior and current run and extracts the one-run factoids. The WEIN 510 then weighs these factoids using statistical re-sampling and calculates the conditional for the given factoid. This conditional is the probability of the null hypothesis, namely, of obtaining the given factoid assuming it does not represent a significant change. The conditional for a given factoid $f_i$ for a variable i, as denoted by a node in the Bayesian belief network 200 (FIG. 2) is mathematically denoted by:

$$P(f_i \backslash A_i)$$

where $A_i$ is a working hypothesis for the variable i.

The distribution, $P(f_i \backslash A)$, must be treated carefully when re-sampling. The main issue is simply that $f_i$ may not exist in the distribution because re-sampling creates only a range of elements. In particular, $f_i$ may exceed the last element in the re-sampled distribution or it may precede the first element in the distribution. It would be simple to set the probabilities to one and zero respectively but then would not satisfy Cromwell's Rule. Thus, when $f_i$ is larger than the last element, $v_N$, then $$P(f_i \backslash A_i) = 1/[N(1+(f_i-v_N)/v_N)]$$

When $f_i$ is smaller than the first element, $v_0$, then $$P(f_i \backslash A_i) = 1 - 1/[N(1+(v_0-f_i)/v_0)]$$

N is the size of the re-sampled distribution.

The WOE, i.e., the evidence obtained by the WEIN 510 weighing the factoids is then given by the Bayes factor, $$\beta_i = \log \frac{P(f_i \mid A_i)}{P(f_i \mid \sim A_i)}$$

which is the log of the likelihood ratio. DIVA does not have direct access to $P(f_i \backslash \sim A)$ because generally the credit analyst rejects all $\sim A$ data feeds. Therefore, $P(f_i \backslash \sim A)$ may be estimated as follows. It is conventionally known in the art that credit analysts tend to reject $f_i$ when it seems obviously less than a threshold value v, which is chosen in accordance to business rules. This estimation can be simulated by computing the transformation, $$P(f_i \backslash \sim A) \approx P(g_A(f_i) \backslash A)$$

where g is the rescale functional. The rescale functional can be any function. However, for the sake of demonstration and simplicity, g is chosen such that $$K_A f = g_A(f)$$

where $K_A$ is the rescale factor which depends on A. In this case, the factoid is scaled linearly; however, the probability distribution, $P(f_i \backslash A)$, is non-linearly transformed. $K_A$ is chosen in such a way that it stretches $P(f_i \backslash A)$ and the resulting $\beta_i$ approximately follows the credit analysts business rules. Business rules describe when and under what conditions $f_i$ should be rejected. Typically, $f_i$ is rejected when it exceeds the business threshold, namely, v.

Factoids need to be resealed because, again, the $P(f_i \backslash \sim A)$ distribution is not available but which is needed for the WOE calculation. Thus, $P(f_i \backslash \sim A)$ may estimated using the rescale technique.

According to an embodiment of the present invention, the above calculations for the Bayes factor $\beta_i$ are done using the Monte Carlo simulation as implemented by the MEECO 314 shown in FIG. 3, or alternatively, by the WEIN 510 shown in FIG. 5.

The third-party API software does not use $\beta_i$ directly. Instead, it uses the likelihood ratio of $\beta_i$ to calculate the posterior probability $P(A_i \backslash f_i)$ using the odds form of Bayes' Rule, namely, $$O(A_i \mid f_i) = O(A_i) \frac{P(f_i \mid A_i)}{P(f_i \mid \sim A_i)}$$

wherein, $$O(A_i) = P(A_i) \backslash P(\sim A_i), \text{and}$$

$$O(A_i \backslash f_i) = P(A_i \backslash f_i) / P(\sim A_i \backslash f_i)$$

and presents to the credit analyst the confirmation which is measured in decibels, namely, $$c_{i,j} = 10 \log_{10} \frac{P(A_i \mid f_j)}{P(A_i)}$$

which is just the ratio of the posterior probability to the prior probability; wherein, $A_i$ is the working hypothesis for variable i, and $f_j$ is the factoid for variable j.

As explained earlier, the above confirmation equation is derived from the Bayes factor. In other words, when a finding is entered into the belief network, the API software propagates the evidence to all nodes. Recall an earlier discussion that the API software uses special mathematical methods and system techniques to make this feasible because the complexity $O(2^N)$ time is otherwise unreasonable. DIVA has prior probabilities from the initial priors and conditionals. It receives the posterior probabilities $P(A_i \backslash f_j)$ from the updated beliefs, which the EBE 312 generates. Thus, DIVA can compute the confirmation.

The above equation shows that $C_{i,j}$ is the log change in probability of a variable in response to evidence about another variable. Thus, If $C_{i,j} > 0$, the working hypothesis, $A_i$, is supported by the evidence. In other words, $A_i$ is confirmed.

If $C_{i,j} < 0$, then $A_i$ is denied by the evidence. It is disconfirmed.

If $C_{i,j}=0$, then $A_i$ is neither supported nor denied by the evidence.

According to an embodiment of the present invention, there is concern with only the second case where $C_{i,j}>0$, and only when $C_{i,j} \geq 5$ because this is the threshold of "positive" confirmation of $A_i$. Above about 11 decibels there is "strong" confirmation of $A_i$, and above about 22 there is "decisive" confirmation of $A_i$. Table 5 shows the commonly known scientific standards of evidence as developed by the British geophysicist, Sir Harold Jefferys, back in the 1930s, as applied in an embodiment of the present invention.

TABLE 5

| Confirmation (db) | Evidence for $A_i$ |
|---|---|
| <0 | None; evidence against $A_i$ |
| =0 | Inconclusive |
| >0-5 | bare evidence |
| 5-11 | Positive |
| 11-22 | Strong |
| >22 | Decisive |

Referring back to FIG. 3, the NAA 310 of DIVA computes a confirmation matrix 350 from the above confirmation equation. This matrix is the main interpretive report used to "explain" the exposure shifts. According to an embodiment of the present invention, programmable rules are then provided in DIVA to interpret the matrix 350. Moreover, the matrix 350 is numerical.

The matrix 350 provides hard confirmation along the diagonal and circumstantial confirmation off the diagonal. In other words, $C_{ii}$, is the hard confirmation for finding i on observed variable i. This is also called self-confirmation. The circumstantial confirmation, $C_{ij}$, gives the "soft" effect of finding i on variable j which may be observable or unobservable. This is also called cross-confirmation. Because there are observables and unobservables in the Bayesian belief to network 200 (FIG. 2), the matrix 350 includes two sub-matrices. The top sub-matrix comprises a k×k square matrix, and includes the observable variables. This top sub-matrix indicates how much the self-evidence confirms or denies the working hypothesis, namely, that some variable $A_i$ has not changed. As mentioned earlier, a meaningful positive value ($\geq 5$) along this diagonal indicates the data is suggesting a significant change in the corresponding observable variable.

With regard to the off-diagonal values in the top sub-matrix, these are indications of sensitivities change logically prior to considering the self-evidence for the respective variable. In other words, $C_{ij}$ for i≠j confirms (or denies) the potential impact of evidence for variable $A_j$ on variable $A_i$. The impact is potential because until the evidence on $A_i$ is actually reviewed, there is only indirect confirmation as opposed to direct confirmation. As for the bottom sub-matrix, it comprises a m×k rectangular matrix for m unobservable variables. These elements are all off-diagonal and thus the confirmations are all circumstantial.

While looking at individual entries in the confirmation matrix is definitive, it is sometimes helpful to see the big picture of implications in a risk management system such as the PSE Server. For this, the concept of importance is used of which there are several varieties. Table 6 shows the importance measurements in accordance to an embodiment of the present invention.

TABLE 2

| Importance | Measurement |
|---|---|
| Self-importance | $\gamma_j = c_{j,j}$ |
| Marginal importance | $\gamma_j = \sum_{i}^{k} c_{i,j}$ |
| Absolute marginal importance | $\gamma_j = \sum_{i}^{k+ni} c_{i,j}$ |
| Relative importance | $\gamma_{j,i} = \gamma_j - \gamma_i$ |

According to an embodiment of the present invention, a generic mode of DIVA operation is essentially assumed. There are, however, specific constraints or "factory settings," that can tailor DIVA for particular operative environments. These setting are shown in Table 7 below.

The primary differences between the settings involve the initiation and the confirmation credibility threshold. In the "real-time" setting, DIVA is automatically invoked by a decision check on the hold/release cycle. In the "follow up" and "passive excesses" settings, the credit analyst invokes DIVA manually. Finally, on the "deep six" setting, DIVA is run periodically to "scrub" the system's data feed.

The credibility threshold is the credibility level below which DIVA suppresses explanations of the confirmation matrix. The point is to qualify or filter explanations in a way that is consistent with the operative environment. For instance, in the real-time mode the credit analyst must in a timely manner decide whether to hold or release a feed. The quality of an explanation, namely its credibility, should be consistent with the criticality of the situation. Thus, DIVA reports only the strongest explanations during real-time.

TABLE 7

| Setting | Mode | Explanation Objective | Initiated | Credibility threshold |
|---|---|---|---|---|
| Real-time | On-line | Changes in exposure profile during hold/release phase | Decision check | Strong |
| Follow-up | Off-line | Changes in exposure profile following up the hold/release phase | On demand | Strong |
| Passive excesses | Off-line | Persistent features in exposure profile | On demand | Substantial |
| Deep Six | Off-line | Potential problems buried deep in the data | Cron (UNIX utility) | Bare mention |

DIVA uses a normative, rather than descriptive, approach to explaining the PSE server. It models how the system behaves and not how the credit analyst behaves. Thus DIVA is a tool for logical analysis. It is designed to support, rather than replace, the credit analyst.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Furthermore, any means-plus-function clauses in the claims (invoked only if expressly recited) are intended to cover the structures described herein as performing the recited function and all equivalents thereto, including, but not limited to, structural equivalents, equivalent structures, and other equivalents.

The invention claimed is:

1. A method for identifying plausible sources of error in a financial risk assessment (FRA) system, comprising:
   identifying, by a computer, a plurality of variables of the FRA system;
   implementing, by the computer, a Bayesian network to represent implications between and among the plurality of variables;
   generating, by the computer, an initial probability for each of the plurality of variables of the FRA system that values for each of the plurality of variables have not changed;
   extracting, by the computer, observed data from one of the plurality of variables of the FRA system;
   determining, by the computer, a change in a value of at least one of the plurality of variables based on the extracted factual data from the FRA system; and
   assessing, by the computer, the initial probability for the one of the plurality of variables of the FRA system based on the change in the value of one of the plurality of variables.

2. The method of claim 1, wherein the Bayesian network comprises a plurality of nodes corresponding to the plurality of variables.

3. The method of claim 2, further comprising:
   assigning each one of the plurality of network nodes to one of the plurality of variables; and
   assigning an initial probability to at least one of the plurality of network nodes.

4. The method of claim 1, wherein the plurality of variables comprise input data of the FRA system.

5. The method of claim 1, wherein one of the plurality of variables comprises information implicated from input data of the FRA system.

6. The method of claim 1, wherein the Bayesian network is implemented by a software having an applications program interface and a graphical user interface.

7. The method of claim 1, wherein generating the initial probability for each of the plurality of variables of the FRA system comprises:
   setting each of the plurality of variables to a hypothesized state;
   generating an initial probability for each of the plurality of variables in the set hypothesized state.

8. The method of claim 1, wherein the observed data comprise bias data and fact data about the one of the plurality of variables of the FRA system.

9. The method of claim 1, wherein extracting observed data from one of the plurality of variables of the FRA system comprises:
   observing data from the one of the plurality of variables of the FRA system;
   storing the observed data in a server archive; and
   extracting the stored data out of the server archive.

10. A system for identifying plausible sources of error, the system comprising:
    a financial risk assessment (FRA) system comprising a server, wherein the server is configured to:
       identify a plurality of variables of the FRA system;
       implement a Bayesian network to represent implications between and among the plurality of variables;
       generate an initial probability for each of the plurality of variables of the FRA system that values for each of the plurality of variables have not changed;
       extract observed data from one of the plurality of variables of the FRA system;
       determine a change in a value of at least one of the plurality of variables based on the extracted factual data from the FRA system; and
       assess the initial probability for the one of the plurality of variables of the FRA system based on the change in the value of one of the plurality of variables.

11. The system of claim 10, wherein the Bayesian network comprises a plurality of nodes corresponding to the plurality of variables.

12. The system of claim 10, wherein the plurality of variables comprise input data of the FRA system.

13. The system of claim 10, wherein one of the plurality of variables comprises information implicated from input data of the FRA system.

14. The system of claim 10, wherein the Bayesian network is implemented by a software having an applications program interface and a graphical user interface.

15. The system of claim 10, wherein the observed data comprise bias data and fact data about the one of the plurality of variables of the FRA system.

16. The system of claim 10, wherein extracting observed data from one of the plurality of variables of the FRA system comprises:
    observing data from the one of the plurality of variables of the FRA system;
    storing the observed data in a server archive; and
    extracting the stored data out of the server archive.

* * * * *